(12) United States Patent
Watson et al.

(10) Patent No.: US 7,684,596 B2
(45) Date of Patent: Mar. 23, 2010

(54) IMAGE ANALYSIS (75) Inventors: Sharon Katrina Watson, Farnborough (GB); Graham Howard Watson, Farnborough (GB)

(73) Assignee: QinetiQ Limited (GB)

(*) Notice: Subject to any disclaimer, the term of this patent is extended or adjusted under 35 U.S.C. 154(b) by 153 days.

(21) Appl. No.: 10/543,911

(22) PCT Filed: Feb. 5, 2004

(86) PCT No.: PCT/GB2004/000400
§ 371 (c)(1), (2), (4) Date: Aug. 1, 2005

(87) PCT Pub. No.: WO2004/072900
PCT Pub. Date: Aug. 26, 2004

(65) Prior Publication Data
US 2006/0083418 A1    Apr. 20, 2006

(30) Foreign Application Priority Data
Feb. 11, 2003    (GB) ................... 0302997.2

(51) Int. Cl.
G06K 9/00    (2006.01)
(52) U.S. Cl. ........................... 382/128; 382/133
(58) Field of Classification Search ............ 382/133, 382/165, 199, 128, 130, 260, 261, 262; 340/146
See application file for complete search history.

(56) References Cited

U.S. PATENT DOCUMENTS

| 5,471,543 | A | * | 11/1995 | Ng et al. ................ 382/173 |
|---|---|---|---|---|
| 5,555,103 | A | * | 9/1996 | Anderson ................ 358/3.19 |
| 5,594,807 | A | * | 1/1997 | Liu ........................... 382/128 |
| 5,764,792 | A | * | 6/1998 | Kennealy ................. 382/133 |
| 5,828,776 | A | * | 10/1998 | Lee et al. ................. 382/133 |
| 5,892,854 | A | * | 4/1999 | de Queiroz et al. ...... 382/288 |
| 6,078,686 | A | * | 6/2000 | Kim .......................... 382/167 |
| 6,137,899 | A | | 10/2000 | Lee et al. |
| 6,185,320 | B1 | | 2/2001 | Bick et al. |
| 6,215,894 | B1 | * | 4/2001 | Zeleny et al. ............ 382/133 |
| 6,690,816 | B2 | * | 2/2004 | Aylward et al. .......... 382/128 |
| 6,785,409 | B1 | * | 8/2004 | Suri ........................ 382/128 |
| 6,825,838 | B2 | * | 11/2004 | Smith et al. ............. 345/419 |
| 6,996,549 | B2 | * | 2/2006 | Zhang et al. ............ 706/16 |

(Continued)

OTHER PUBLICATIONS

Raymond J. Madachy "Image analysis automatic classification of mitotic cervical cells", 1988.*

(Continued)

*Primary Examiner*—John B Strege
(74) *Attorney, Agent, or Firm*—McDonnell Boehnen Hulbert & Berghoff LLP (57) ABSTRACT

A method for the automated analysis of digital images, particularly for the purpose of assessing nuclear pleomorphism from images of histological slides for prognostication of breast cancer. The method includes the steps of identifying the locations of objects within the image which have intensity and size characteristics consistent with epithelial cell nuclei and deriving boundaries for those objects. Statistics concerning at least the shapes of the derived boundaries are calculated and clutter is rejected on the basis of those statistics and/or they are used to assign probabilities that the respective objects are epithelial cell nuclei, and a measure of the variability of at least the areas enclosed by such boundaries is then calculated.

41 Claims, 4 Drawing Sheets

U.S. PATENT DOCUMENTS

| | | | | |
|---|---|---|---|---|
| 7,187,800 | B2* | 3/2007 | Hibbard | 382/173 |
| 7,203,350 | B2* | 4/2007 | Leichter et al. | 382/128 |
| 2002/0118887 | A1* | 8/2002 | Gindele | 382/260 |
| 2003/0068626 | A1* | 4/2003 | Wang et al. | 435/6 |
| 2004/0234988 | A1* | 11/2004 | Oka et al. | 435/6 |

OTHER PUBLICATIONS

Neil Gordon and David Salmond "Bayesian target selection after group pattern distortion", IEEE, 1996.*

Madachy, et al. "Image Analysis for Automatic Classification of Mitotic Cervical Cells", IEEE, pp. 372-374 (1988).

Hibbard, "Multiscale Detection and Analysis of the Senile Plaques of Alzheimer's Disease", IEEE, pp. 1218-1225 (1995).

Netsch et al. "Scale-space Signatures for the Detection of Clustered Microcalculations in Digital Mammograms" Database Medline XP-002301991 (1999).

Martin et al "Automated Image Analysis of Glimoas an Objective and Reproducible Method for Tumor Grading" Database Medline XP-002302595 (1984).

Lindberg, "Feature Detection with Automatic Scale Selection", Int'l Journal of Computer Vision, pp. 79-116 (1998).

Jones et al. "Multiresolution Analysis of Remotely Sensed Imagery", Int'l Journal of Remote Sensing, pp. 107-124 (1991).

Cohen et al. "Finite-Element Methods for Active Contour Models and Balloons for 2-D and 3-D Images", IEEE pp. 1131-1147 (1993).

Netsch et al. "Scale-Space Signatures for the Detection of Clustered Microcalcifications in Digital Mammograms", IEEE pp. 774-786 (1999).

Martin et al. "Automated Image Analysis of Gliomas an Objective and Reproducible Method for Tumor Grading", pp. 160-169 (1984).

* cited by examiner

IMAGE ANALYSIS

FIELD OF THE INVENTION

The present invention relates to the automated analysis of digital images. It is more particularly concerned with the automated assessment of nuclear pleomorphism from digital images of histological or cytology specimens and most particularly for the purpose of assessing the presence and severity of cancer in breast tissue, and it is in this context that the invention is principally described herein. The invention may, however, also find application in the assessment of other forms of cancer, such as colon and cervical cancer, and in the analysis of various other kinds of structure presenting image components which are amenable to identification in a similar way, that is to say images containing objects with relatively smooth boundaries and whose shape is generally convex, embedded in cluttered backgrounds.

BACKGROUND AND SUMMARY OF THE INVENTION

Many thousands of women die needlessly each year from breast cancer, a cancer from which there is theoretically a high probability of survival if detected sufficiently early. If the presence of cancerous tissue is missed in a sample, then, by the time the next test is undertaken, the cancer may have progressed and the chance of survival significantly reduced. The importance of detecting cancerous tissue in the samples can therefore not be over-emphasised.

A typical national breast screening programme uses mammography for the early detection of impalpable lesions. Once a lesion indicative of breast cancer is detected, then tissue samples are taken and examined by a trained histopathologist to establish a diagnosis and prognosis. More particularly, one of the principal prognostic factors for breast cancer is the extent of nuclear pleomorphism present in a sample. That is to say in normal tissue samples the nuclei of epithelial cells have a regular structure in terms of size and shape, whereas in cancerous tissue the nuclei can become larger and irregularly shaped, with a marked variation in shape and size.

In the existing manual procedure for grading nuclear pleomorphism a histopathologist places a slide under a microscope and examines a region of it (referred to as a tile) at a magnification of ×40 for variations in the size and shape of epithelial cell nuclei. His observations are then converted to a points score indicative of cancer grade typically in accordance with the following scheme:

| Nuclear Pleomorphism | Points Score |
|---|---|
| Small, uniform cells | 1 |
| Moderate nuclear size and variation | 2 |
| Marked nuclear variation | 3 | where a points score of 1 is the least serious and 3 is the most serious.

This is, however, a time consuming, labour intensive and expensive process. Qualification to perform such examination is not easy to obtain and requires frequent review. The examination itself requires the interpretation of colour images by eye, a highly subjective process characterised by considerable variations in both inter, and intra-observer analysis, i.e. variances in observation may occur for the same sample by different histopathologists, and by the same histopathologist at different times. For example, studies have shown that two different histopathologists examining the same ten samples may give different opinions on three of them, an error of 30%. This problem is exacerbated by the complexity of some samples, especially in marginal cases where there may not be a definitive conclusion. If sufficient trained staff are not available this impacts upon pressures to complete the analysis, potentially leading to erroneous assessments and delays in diagnosis.

These problems mean that there are practical limitations on the extent and effectiveness of screening for breast cancer with the consequence that some women are not being correctly identified as having the disease and, on some occasions, this failure may result in premature death. Conversely, others are being incorrectly diagnosed with breast cancer and therefore undergoing potentially traumatic treatment unnecessarily.

It is thus an aim of the invention to provide an automated method of image analysis which can be embodied in a robust, objective and cost-effective tool to assist in the diagnosis and prognosis of breast cancer, although as previously indicated the invention may also find application in other fields.

In one aspect the invention accordingly resides in a method for the automated analysis of a digital image comprising an array of pixels, including the steps of: identifying the locations of objects within the image which have specified intensity and size characteristics; deriving respective boundaries for respective such objects; assessing the significance of objects based on statistics concerning at least the shapes of their respective derived boundaries; and calculating a measure of the variability of at least the areas enclosed by said derived boundaries subject to the results of said assessment of significance.

As will be understood from the ensuing detailed description of preferred embodiments, such a method is of use in grading nuclear pleomorphism from images of histopathological slides.

The invention also resides in apparatus for the automated analysis of a digital image comprising means to perform the foregoing method and in a computer program product comprising a computer readable medium having thereon computer program code means adapted to cause a computer to execute the foregoing method and in a computer program comprising instructions so to do.

These and other aspects of the invention will now be more particularly described, by way of example, with reference to the accompanying drawings and in the context of an automated system for grading cancer on the basis of the assessment of epithelial cell nuclear pleomorphism in digital images of histopathological slides of potential carcinomas of the breast.

DETAILED DESCRIPTION

Figure 1:
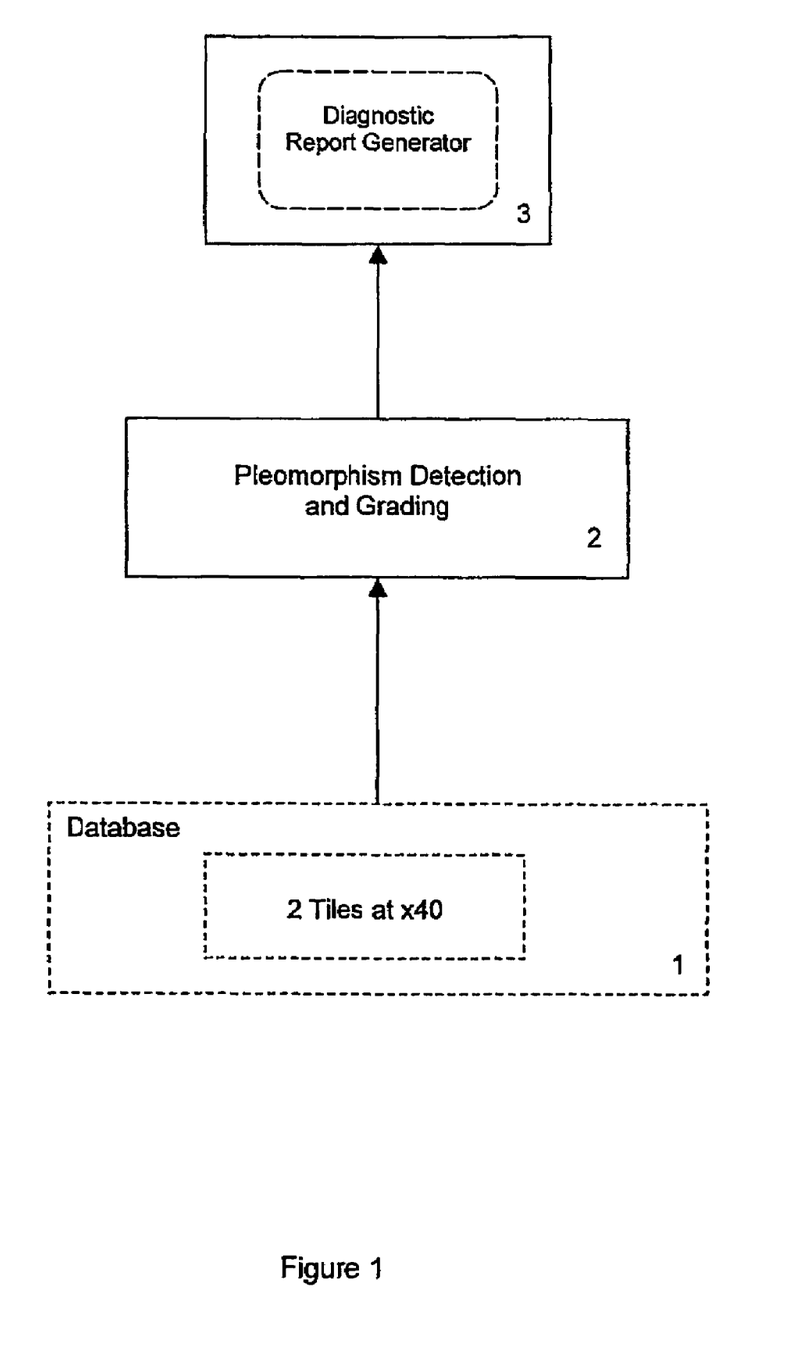
FIG. 1 is a block diagram of an automated process in accordance with the invention for assessing the degree of nuclear pleomorphism for patient diagnosis.

FIG. 1 shows a process for the assessment of tissue samples in the form of histopathological slides of potential carcinomas of the breast. The process assesses the degree of nuclear pleomorphism of epithelial cells to produce a parameter for use by a pathologist as the basis for assessing patient diagnosis. It employs a database 1, which maintains digitised image data obtained from histological slides. Sections are cut from breast tissue samples (biopsies), placed on respective slides and stained using the staining agent Haematoxylin & Eosin (H&E), which is a common stain for delineating tissue and cellular structure.

To obtain the digitised image data for analysis, a histopathologist scans a slide under a microscope and at 40× linear magnification selects regions of the slide which appear to be most promising in terms of nuclear pleomorphism assessment. Each of these regions is then photographed using the microscope and a digital camera. In one example a Zeiss Axioskop microscope has been used with a Jenoptiks Progres 3012 digital camera. This produces for each region a respective digitised image in three colours, i.e. red, green and blue (R, G & B). Respective intensity values in the R, G and B image planes are thus obtained for each pixel in an array. In the preferred embodiment there is an eight-bit range of pixel intensities (values of 0 to 255) for each colour and the array comprises 1476 pixels across by 1160 pixels down, with a pixel size of 220 nm square. The image data is stored temporarily at 1 for later use. Two digitised images (electronic equivalents of files) are used for the detection and grading of nuclear pleomorphism at 2, which then provides input to a diagnostic report at 3. In principle the processing stages to be described in detail below can operate on a single waveband (R, G or B) image or a combination of them. In practice, however, the red waveband has been found to contain the most information for discriminating between epithelial cell nuclei and other tissue when stained with H&E, and is assumed to be used in the following description. With the given method of staining, cell nuclei appear dark relative to the background. The process can be performed in a suitably programmed personal computer (PC) or other general purpose computer of suitable processing power or in dedicated hardware.

Overview of First Preferred Pleomorphism Detection and Grading

Figure 2:
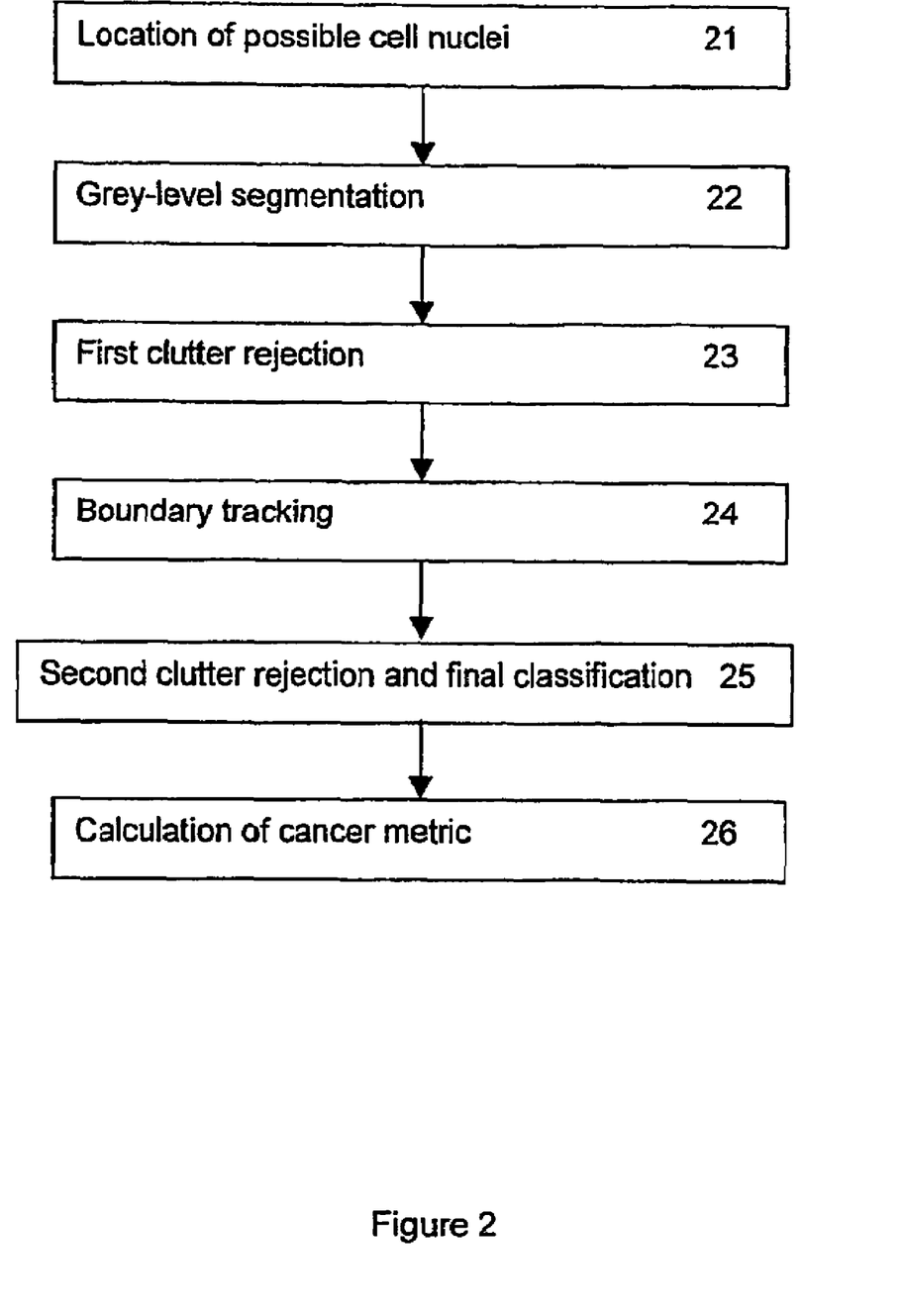
FIG. 2 is a more detailed block diagram of the main stages in a first preferred embodiment of the pleomorphism detection and grading block of FIG. 1.

FIG. 2 shows in more detail the processing stages comprised in the block 2 of FIG. 1 in a first preferred embodiment. They are carried out for both of the two digitised images referred to above and will now be described for one such image (tile). To aid in the understanding of this description, the aim of the process is to identify the nuclei of as many epithelial cells as possible (whether cancerous or not), measure their characteristics, and hence assess their variability to quantify nuclear pleomorphism. Note that it is not necessary to identify 100% of the cell nuclei in any given tile, only a sufficient number to form a representative set from which meaningful statistics can be measured; on average it has been found that this algorithm identifies 50% of the available nuclei.

The broad structure of the algorithm is in six stages as shown in FIG. 2:

(21) Image filtering to identify locations of possible cell nuclei.

(22) Image segmentation to determine a set of pixels associated with each candidate object, in order to characterise their extents.

(23) Rejection of unwanted objects such as stromal cells or lymphocytes using a classifier based on size and grey-level characteristics.

(24) Tracking of the objects' boundaries, and finding shape measurements such as curvature and compactness.

(25) Second clutter rejection stage, rejecting objects of incorrect size or shape, and final classification based on size and shape measurements to give a likelihood that each detected object is an epithelial cell nucleus.

(26) Calculation of cancer metric, quantifying the variation in nuclear size.

Further details of these processing stages are described in the following sections.

21 Location of Possible Cell Nuclei

Epithelial cell nuclei may be hollow or solid, so the algorithm needs to be able to identify both types. The fact that many nuclei are hollow precludes a simple intensity thresholding method, since setting the threshold low enough to detect most of the objects of interest would yield an excess of clutter.

One strategy for identifying both hollow and solid objects is to recognise their edges. The traditional image processing method for doing this is to apply some form of difference filter to the image (e.g. the Sobel as described in A Rosenfeld and A C Kak, 'Digital Picture Processing', Vols. 1 & 2, Academic Press, New York, 1982), which enhances contrasts in grey-level intensity and suppresses areas of constant intensity. The resulting edge-filtered image would then be thresholded, so that only the pixels corresponding to the greatest changes in contrast are retained. Groups of adjacent pixels would then be linked together to form regions, which in this case would ideally correspond to the nuclear boundaries.

However, in the histological images for which the present process is intended, the nuclear boundaries are often poorly defined, either being faint, or having a gradual rather than an abrupt change in grey level intensity across the boundary. This means that, to set an appropriate threshold on the edge-filtered image such that most of the nuclear boundaries are identified, the threshold would have to be so low that a lot of background clutter (i.e. objects within the tissue not corresponding to cell nuclei) would also be included. Even use of hysteresis thresholding (as described e.g. in A Rosenfeld and A C Kak, 'Digital Picture Processing', Vols. 1 & 2, Academic Press, New York, 1982) may be inadequate.

Another problem is that of closely packed cells. Even if the problems associated with edge detection mentioned above could be overcome, the resulting linked edges could encompass several nuclei at once, leading to invalid measurements for their shape and size, particularly the latter. It is important not to pick out cell clusters, since one of the indicators for the most severe cancer (Grade 3) is the presence of very large epithelial cells; just a few of these indicates a Grade 3 classification.

The approach adopted in the present embodiment for identifying the locations of epithelial cell nuclei is based on looking for concentrations of pixels which are dark relative to the background; these are not necessarily connected groups of dark pixels, but a region containing a sufficient number of dark pixels. This method is able to encompass slides containing both solid and hollow nuclei, since in the latter, a region surrounding a hollow nucleus will contain at least all the dark pixels in the nuclear boundary, and often some of the interior pixels are still darker than the background pixels exterior to the nucleus.

The preferred approach is to use the multiresolution blob filtering described below. The general principle is, given that the approximate size of the nuclei is known, to apply a radially-symmetric filter whose output is large in magnitude when there is a region of local brightness or darkness whose shape and size approximately matches that of the filter. This filter should be a difference filter with zero mean, so areas of constant intensity are suppressed.

The method will now be described in terms of a specific implementation, namely a multi-scale blob filter as known e.g. from "Multiresolution analysis of remotely sensed imagery", J. G. Jones, R. W. Thomas, P. G. Earwicker, Int J. Remote Sensing, 1991, Vol 12, No 1, pp 107-124. The process will be described for filtering the image using a particular size of blob filter, where these are defined at successive octave (powers of 2) scale sizes.

The recursive construction process for the multi-scale blob filter involves two filters: a 3×3 Laplacian blob filter (L), and a 3×3 smoothing filter(s) as defined below.

$$L = \begin{pmatrix} -1 & -1 & -1 \\ -1 & 8 & -1 \\ -1 & -1 & -1 \end{pmatrix}, \quad s = \frac{1}{16}\begin{pmatrix} 1 & 2 & 1 \\ 2 & 4 & 2 \\ 1 & 2 & 1 \end{pmatrix}$$

These two filters form a basis for filtering over a set of octave scale sizes, according to the following process:

To enhance blob-shaped objects at the original resolution (octave scale 1, pixel size 1), the image is correlated with the 3×3 Laplacian filter alone:

$$F_1(m, n) = \sum_{i=-1}^{1} \sum_{j=-1}^{1} I(m+i, n+j) * L(i+2, j+2)$$

where I is the original image, and the range of the indices m and n is set such that the indices in the summation above are always within the original image dimensions (so m and n start at 2). Values of the filtered image at locations outside these ranges are set to zero.

For computational efficiency, multiplications by ±1 need not be performed explicitly. Thus the filter output value for a pixel located at position (i,j) is given by:

$F_1(i,j) = 8.I(i,j) - I(i-1,j-1) - I(i-1,j) - I(i-1,j+1) - I(i,j-1) - I(i,j+1) - I(i+1,j-1) - I(i+1,j) - I(i+1,j+1)$

To enhance blob-shaped objects at a resolution one octave above the original (octave scale 2, pixel size 3), the image is first correlated with the 3×3 smoothing filter(s), forming a smoothed image ($S_2$). The 3×3 Laplacian blob filter (L) is then expanded by a factor of two, by padding it with zeros, to form a 5×5 filter [−1 0 −1 0 −1; 0 0 0 0 0; −1 0 8 0 −1; 0 0 0 0 0; −1 0 −1 0 −1]. This is then correlated with the smoothed image ($S_2$) to form a filtered image ($F_2$), but for computational efficiency, only the non-zero filter coefficients are used, thus:

$$S_2(m, n) = \sum_{i=-1}^{1} \sum_{j=-1}^{1} I(m+i, n+j) * s(i+2, j+2)$$

$$F_2(m, n) = \sum_{i=-1}^{1} \sum_{j=-1}^{1} S_2(m+2i, n+2j) * L(i+2, j+2)$$

where I is the original image, and the range of the indices m and n is set such that the indices in the summation above are always within the original image dimensions (so m and n start at 4). Values of the filtered image at locations outside these ranges are set to zero.

The above double correlation is equivalent to a single correlation of the original image with a 7×7 filter formed from correlating the expanded 5×5 Laplacian with the 3×3 smoothing filter, but this larger filter is never formed explicitly.

To enhance blob-shaped objects at a resolution two octaves above the original (scale 3, pixel size 7), the smoothing filter is expanded by a factor of 2 in the same manner as the Laplacian above, then correlated with the smoothed image ($S_2$) above to give a lower-resolution smoothed image ($S_3$) thus:

$$S_3(m, n) = \sum_{i=-1}^{1} \sum_{j=-1}^{1} S_2(m+2i, n+2j) * s(i+2, j+2)$$

Following this, the 5×5 Laplacian filter is expanded by a factor of 2 by padding with zeros to form a 9×9 filter, which is correlated with the smoothed image ($S_3$) in the same computationally efficient manner, thus:

$$F_3(m, n) = \sum_{i=-1}^{1} \sum_{j=-1}^{1} S_3(m+4i, n+4j) * L(i+2, j+2)$$

This process is repeated to obtain results at successive octave scales, namely expanding both the smoothing filter and the Laplacian blob filter each time.

The above process may be used to produce a "blob-filtered" image at any of the required octave scales. Objects of interest (i.e. clusters of dark pixels in this case) will have the greatest values of the magnitude of the filter output (of negative sign in this case). The locally strongest filter output will occur at the centre of the object of interest. Individual objects (called "blobs") are now identified by finding local minima of the filter output, where each blob is assigned a position and intensity, the latter being the value of the filter output at the local minimum.

In this application objects which may represent epithelial cell nuclei, which are dark relative to the background, are identified by finding local minima of the filter output at two chosen scales, in this instance octave scale 5 (a nuclear size of 31 pixels across) and scale 6 (63 pixels across). In less severe cancers the epithelial cell nuclei are smaller, so tend to get picked up at scale 5, while in more severe cancers the nuclei may be larger, and hence are detected at scale 6. Also, scale 6 alone is not very effective where the nuclei are closely packed; scale 5 is better at picking them out in such circumstances. The aim is to ensure that the nuclei of as many epithelial cells as possible (not just the cancerous ones) are identified to measure the overall variability in nuclear size for pleomorphism.

At each scale the local minima of the blob filter outputs in position are located (since dark objects are of interest), and the corresponding positions designate the most likely approximate locations of the objects in question. These positions are only approximate at this stage; they are used as nominal centres for positioning a local region around the respective object for the segmentation process in stage 22. The union (Logical OR) of the blobs found at these two scales is taken, so that if a blob is present at scale 5 or scale 6 or both scales, then it is output and the corresponding object is retained for further processing.

22 Grey-Level Segmentation

The aim of this stage is to identify a set of connected pixels corresponding to each object located in stage 21, so that the size and shape of the object can be more accurately measured. Because of variations in both cell intensity and lighting, local (or adaptive) thresholding should be applied for each object. The full-sized original image (red component) is used for this stage, except that it is "reversed in sign" by subtracting each pixel value from 255, so that objects which originally appeared dark now appear bright, and vice versa.

Segmentation is the process of extracting some group of pixels from an image according to a given set of criteria (e.g. the simplest being intensity value). The segmentation process used here takes the reversed input image (red component) together with the output from stage 21 above and extracts the raw image pixels which correspond to a specified region around each blob. For each blob, a circular mask is centred on the respective position found from the respective minimum of the filter output in stage 21 with a radius of 31 pixels for scale 5 and 63 pixels for scale 6. For raw image pixels within the respective mask two thresholds are calculated as follows:

Upper threshold=a

Lower threshold=$b+0.1*(a-b)$ where:

a=the $95^{th}$ percentile value of image pixels within the mask b=the $65^{th}$ percentile value of image pixels within the mask The $95^{th}$ percentile is defined to be the value such that 95% of the pixels within the data set (in this case within the circular mask) have values which lie below the percentile value. Similarly for the $65^{th}$ percentile.

These two thresholds are then used for hysteresis thresholding (such as described in A Rosenfeld and A C Kak, 'Digital Picture Processing', Vols. 1 & 2, Academic Press, New York, 1982) of the pixels within the mask area. The purpose of hysteresis thresholding is to accept or reject pixels based upon the two thresholds. The hysteresis thresholding accepts a pixel if that pixel has a value above the higher threshold or if its value is above the lower threshold and that pixel is connected to another pixel that is above the higher threshold. "Accepted" and "rejected" pixels are then assigned the values 1 and 0 respectively, so that the output from this stage is a set of binary images, one for each mask, each of which should contain a region comprising a connected set of pixels labelled 1 (possibly with holes) corresponding to a dark region within the original slide of approximately the same size as to be expected from an epithelial cell nucleus. If there is more than one such region for the same mask, only the one closest to the centre of the mask is selected for stage 23 below. Furthermore, if any such region touches the border of the respective mask it is treated as clutter and not taken forward to stage 23.

23 First Clutter Rejection

The above process may, in addition to identifying true epithelial cell nuclei, also detect dark regions within the image which are not epithelial cell nuclei, for example stromal cells, lymphocytes, cell nucleoli (i.e. not the complete nuclei), or other dark cellular structure within the background tissue. This "clutter" must be removed before the calculation of nuclear statistics.

Various features are measured from the data in regions of the original image (red component) corresponding to each of the regions identified in stage 22 above. These are:

Area=number of pixels within the region

Thickness=minimum thickness of the region, defined thus: for each pixel in the region, find the minimum distance from that pixel to the outside of the region. Thickness is then defined to be the maximum of these minimum distances. Note that thickness is not the same as width; for a rectangle the thickness is half the width, and for a circle the thickness is the radius.

Maximum grey-level of the pixels within the region.

Minimum grey-level of the pixels within the region.

Different types of clutter can then be rejected using various combinations of these features. For example, lymphocytes are smaller and darker than epithelial cell nuclei, while stromal cells are darker and thinner. It has been observed that any single feature in isolation is insufficient for accurate discrimination between epithelial cell nuclei and clutter, but that combinations of two or more of the above features are effective.

The Fisher linear classifier has been chosen as the preferred classification method for these multi-dimensional features. This is a standard statistical classification method (described for example in Section 4.3 of "Statistical Pattern Recognition" by Andrew R. Webb, Arnold Press, 1999) based on the projection of multidimensional data into a lower dimensional space, which can then more easily be classified into the required number of classes. For example, if the higher dimensional feature data listed above (area, thickness, maximum and minimum grey level) can be projected such that the means of the classes (epithelial cell nuclei, other cellular structure) are maximised and the variances are minimised then there is good class separation and unwanted regions can be rejected. The decision boundary for the Fisher classifier is obtained by training the classifier on a large number of example slides provided by a histopathologist where accurate ground truth is also available.

The Fisher linear classifier uses a set of information about each object that has been derived by analysis as described above. Each information set is a feature vector, that is an ordered list of real numbers each describing some aspect of the object; each component number is denoted an object feature. The purpose of the classification algorithm is to discriminate between two classes of object based on the information contained in their feature vectors. The output of the algorithm is a set of numbers, one for each object, indicating the likelihood that the structure which it represents is a member of one of the two chosen classes (in this case the classes are epithelial cell nuclei and "other").

For a given feature vector x, the Fisher classifier output is defined as:

$$F = \sum_{k=1}^{n} a_k x_k$$

where $a_k$ are prescribed real numbers and $x=[x_1 \ldots x_k]$ is the feature vector x. The parameters $a_k$ are chosen to give the lowest number of misclassifications for objects with known class.

In this case, the feature vector x consists of the object's area, its thickness, and the maximum and minimum grey-levels within the corresponding region. The Fisher classifier value is given by:

$$F = a_1 A + a_2 T + a_3 G_{min} + a_4 G_{max} + a_5$$

where A is the area, T is the thickness, $G_{max}$ and $G_{min}$ are the maximum and minimum grey-levels respectively, and the coefficients $a_j$ have been derived from the training stage as [0.0059, 0.7633, −4.3937, 3.9017, −6.9772] for a scale 5 blob and [−0.0015, 0.8083, −0.3842, 0.8829, −7.4761] for a scale 6 blob. Only those blobs whose Fisher classifier values exceed zero are retained.

The output from this stage is a set of regions which should have a better correspondence to epithelial cell nuclei. However, there may still be regions which do not correspond to individual epithelial cell nuclei, for example clusters of nuclei, so a second clutter rejection stage is required which uses the shape of the boundary, derived in the next processing stage 24.

24 Boundary Tracking

This stage involves identifying a nominal boundary (which is some noticeable change in grey level) of each remaining object. This boundary is defined as a contour (i.e. a curve consisting of points of equal grey level) from the blob filter (stage 21) output, but at a slightly higher resolution than that used to extract the blob (one octave scale lower). For example, blobs extracted at scale 5 (31 pixels across) will use the blob filter output at scale 4 (15 pixels across) for contouring and blobs extracted at scale 6 (63 pixels across) will use scale 5. Contours are obtained as follows.

For each of the objects remaining after stage 23, a local region of interest (ROI) is selected. This ROI is centred on the nominal centre of the object (as found in stage 21) and has an extent of 50 pixels in each direction, the region size being truncated if necessary to ensure the ROI lies within the bounds of the original image. This allows ROIs which would otherwise overlap the edges of the image to be included. Alternatively the ROIs could be defined by taking the regions identified in stage 23 and adding a border of a selected number of pixels. In either case, it is desirable that the ROIs exceed the size of those regions somewhat in order to ensure the generation of the contours.

The region defined by the ROI is used to define a sub-image within the output of the blob filter (stage 21) at the selected scale indicated above. If a corresponding blob was present at both scales 5 and 6 at the end of stage 21 then contours are obtained using the same ROI at both scales 4 and 5. The respective sub-image will consist of both positive and negative grey levels and contours are sought at a predefined level of −10, which has been found to be best experimentally. In this embodiment, the Matlab® contour function is employed but any contouring algorithm can be used which returns contours in the same form, as a set of contiguous points ordered around the contour; (Matlab® is a well known computation tool from The MathWorks, Inc.). Matlab® returns a set of locations with sub-pixel resolution which are in order of location around the contour, i.e., traversing the set of locations is equivalent to walking around the contour. Contours are only treated as valid and retained for further processing, however, if they satisfy all the following three conditions:

they form closed loops within the ROI, i.e. the last contour point is the same as the first contour point;

they are consistent with the location of the object (there is at least one contour point whose distance from the nominal centre of the object is less than or equal to 30 pixels);

they have the correct intensity orientation, namely pixels within the contour are darker than those outside the contour.

A tracking algorithm is then applied to each valid contour representing a respective object's boundary, to smooth the contour and measure the curvature of the boundary. The particular algorithm which has been used in the preferred embodiment is based on a Probability Density Association Filter (PDAF), such as described in Y. Bar-Shalom and T. E. Fortmann, "Tracking and Data Association", Mathematics in Science and Engineering series, vol 179, Orlando, Fla., Academic Press, 1988. This type of tracking algorithm is designed to estimate the parameters of a chosen object (target) in the presence of other measurements which are not related to the object in question (noise and clutter). In this case the 'target' state variables are the position, orientation and curvature of the object's boundary, and the measurements are the positions of the contour points and the orientations of the lines joining each pair of contour points.

The PDAF filter requires a model for the dynamics of the boundary state. The boundary dynamics is given by a constant curvature (the radius of curvature is set to 30 pixels) plus an assumed random perturbation known as system noise. This noise is determined by the variance of curvature perturbation, which is chosen according to how irregular the boundary of an epithelial cell nucleus is expected to be. In the preferred embodiment the curvature variance is 9 for position and 0.09 for angle (in radians).

As a starting point, it is assumed that for each object potentially representing an epithelial cell nucleus a connected set of edge features has been extracted from the image. In this case, edge features are line segments joining two adjacent contour points. Each edge feature has the following measurements that were made as part of the contour extraction process:

Position $x_m$, $y_m$ (horizontal and vertical image coordinates) of the centre of the edge Orientation $\theta_m$, i.e. the angle between the edge and the horizontal.

The purpose of the tracker is to estimate the most likely true location, orientation and curvature $x_s$, $y_s$, $\theta_s$, $\kappa$ of the boundary at each point from the above measurements, given that there are measurement errors with an assumed Gaussian distribution. The following information vectors are defined:

The measurement vector $z=(x_m, y_m, \theta_m)$;

The system state vector $x=(x_s, y_s, \theta_s, \kappa)$.

To use the PDAF filter to do this, the following information about the true boundary and the measurement process is required:

The relationship between the position, orientation and curvature of neighbouring points on the boundary (the system model). This incorporates a transition matrix $\Phi$ linking neighbouring states x and a system noise model that adds extra random perturbations to x.

The relationship between the measurement vector z and the system state x. This incorporates a transition matrix H linking x to z and a measurement noise model that adds extra random perturbations to z.

It is assumed that not all of the edge features are associated with the nuclear boundary; the ones that are not are denoted clutter.

In its most general form the PDAF processes several measurements z at each step in estimating x. In this case only one edge feature is processed at a time, so there are only two hypotheses to be tested; either the feature is from clutter or from the real nuclear boundary.

The system transition matrix $\Phi$ is based on constant curvature, so to predict a neighbouring system state the unique circle or straight line with curvature $\kappa$, tangent slope $\theta_s$ going through the point $x_s$, $y_s$ is extrapolated to the point that is closest to the next measurement point.

The system noise has a Gaussian distribution with zero mean and a covariance matrix based on independent perturbations in curvature, orientation and lateral offset (movement in a direction normal to the boundary). A Brownian model is used, where the standard deviations of perturbations in curvature, orientation and lateral offset are proportional to the square root of the arc length of the extrapolated circle of the previous paragraph. The accumulated effect of curvature perturbation on orientation and lateral offset is also modelled, resulting in the following covariance matrix:

$$Q = \sigma_k^2 \begin{pmatrix} s & \frac{1}{2}s^2 & \frac{1}{6}s^3 \\ \frac{1}{2}s^2 & \frac{1}{3}s^3 & \frac{1}{8}s^4 \\ \frac{1}{6}s^3 & \frac{1}{8}s^4 & \frac{1}{20}s^5 \end{pmatrix} + s \begin{pmatrix} 0 & 0 & 0 \\ 0 & \sigma_{s\theta}^2 & 0 \\ 0 & 0 & \sigma_{sy}^2 \end{pmatrix}$$

with respect to the system curvature $\kappa$, system slope $\theta$ and lateral offset respectively, where s is the arc length (the circular distance between the previous point and the estimate of the next point). The constants $\sigma_k$, $\sigma_{s\theta}$, $\sigma_{sy}$ define the average roughness of the nuclear boundary, and depend on the type of cell being analysed.

The measurement transition matrix H maps the system parameters to the measurement parameters in the natural way:

$$\begin{pmatrix} x_m \\ y_m \\ \theta_m \end{pmatrix} = H \begin{pmatrix} x_s \\ y_s \\ \theta_s \\ \kappa \end{pmatrix}, \quad H = \begin{pmatrix} 1 & 0 & 0 & 0 \\ 0 & 1 & 0 & 0 \\ 0 & 0 & 1 & 0 \end{pmatrix}$$

The measurement noise is based on independently Gaussian distributed perturbations of slope and lateral offset, resulting in the following covariance matrix with respect to measurement slope and lateral offset respectively:

$$R = \begin{pmatrix} \sigma_{m\theta}^2 & 0 \\ 0 & \sigma_{my}^2 \end{pmatrix}$$

The constants $\sigma_{m\theta}$, $\sigma_{my}$ define the average smoothness of the nuclear boundary, and depend on the type of cell being analysed.

The following constants are used to define the clutter model:

$\rho$=Clutter density=average number of edges per unit area that are not associated with the nuclear boundary.

$P_D$=Probability that the edge feature is associated with the true nuclear boundary.

These constants depend on the clutter present in the image, both its edge strength relative to the nuclear boundary and its average spatial density.

For a nucleus with average radius r the following parameters of the above model are used (all units are image pixels):

$\sigma_k = r^{-3/2}$ $\sigma_{my} = 3$ $\sigma_{m\theta} = 0.3$ radians $\sigma_{sy} = 0.9$ $\sigma_{s\theta} = 0.09$ radians $\rho = 0.01$ $P_D = 0.8$ The initial value for the system covariance matrix M is given by:

$$M_0 = \begin{pmatrix} \sigma_{my}^2 & 0 & 0 \\ 0 & \sigma_{m\theta}^2 & 0 \\ 0 & 0 & \sigma_{k0}^2 \end{pmatrix}, \text{ where } \sigma_{k0} = 1/r$$

The PDAF estimator is now applied sequentially as follows. The matrices $H_k$, $Q_k$ and $R_k$ are all constant in this application (as defined above). The following expressions are those known from the Bar-Shalom and Fortmann reference quoted above.

Update:

Innovation $$v'_k = \sum_{i=1}^{N_k} \beta_{ki} v_{ki} \text{ where } v_{ki} = z_{ki} - H_k \bar{x}_k$$

Kalman Gain Matrix $K_k = M_k H_k^T S_k^-$ where $S_k^- = H_k M_k H_k^T + R_k$

Beta Weights $$\beta_{ki} = \begin{cases} e_{ki} / \left[ b + \sum_{j=1}^{N_k} e_{kj} \right] & \text{for } i \neq 0 \\ b / \left[ b + \sum_{j=1}^{N_k} e_{kj} \right] & \text{for } i = 0 \end{cases}$$

where $e_{ki} = \exp(-1/2 v_{ki}^T S_k^{-1} v_{ki})$ for $i \neq 0$, and $b = \rho(1 - P_D)\sqrt{|2\pi S_k|}/P_D 2$ State Estimate Update $\hat{x}_k = \bar{x}_k + K_k v'_k$ Error Covariance Update $$P_k = \beta_{k0} M_k + (1 - \beta_{k0}) P^* + K_k \left[ \left( \sum_{i=1}^{N_k} \beta_{ki} v_{ki} v_{ki}^T \right) - v'_k v'^T_k \right] K_k^T$$

where $P^* = [I - K_k H_k] M_k$

Prediction:

State Estimate Extrapolation $\bar{x}_{k+1} = \Phi_k \hat{x}_k$

Error Covariance Extrapolation $M_{k+1} = \Phi_k P_k \Phi_k^T + Q_k$

This process continues until the entire contour is traversed (i.e. returned to the starting point). This is then repeated around the contour for a second time (using the final conditions from the first pass as starting conditions for the second pass); this ensures that the final estimate of the smoothed contour is independent of the assumed initial conditions.

The outputs of the tracking filter are a set of smoothed locations describing the boundary of each object, and a smoothed set of curvature measurements.

The output from this stage is a set of boundary features for each object, namely area, minimum curvature and compactness, (where compactness is defined as perimeter$^2$/area). A more accurate estimate of area is obtained from the respective boundary using Green's Theorem (such as described in Chap 6 of 'Vector Analysis and Cartesian Tensors', D. E. Bourne and P. C. Kendal, 2$^{nd}$ ed., Nelson, 1977). This gives the following formula for area:

$$A = \left| x_n(y_1 - y_n) + \sum_{i=1}^{n-1} x_i(y_{i+1} - y_i) \right|$$

where $(x_i, y_i)$ are the contour points defining the respective boundary.

25 Second Clutter Rejection and Final Classification

A second clutter rejection stage aims to remove objects tracked in stage 24 which are unlikely to be epithelial cell nuclei. For example, anything too large or too small, or whose shape is highly non-circular, is not likely to be an epithelial cell nucleus. Therefore any objects whose area is less than 400 pixels or whose minimum curvature is less than −0.03 (so the boundary is not convex) are rejected.

The second aim of this stage is to assign probabilities that each of the remaining objects represents an epithelial cell nucleus. The attributes above (size, shape) are not independent (e.g. a larger object may be less compact and still be OK), so it is not appropriate to apply stricter thresholds to each measurement, but a combination is effective. The process involves a second stage of classification and clutter rejection based on the Fisher linear classifier (see stage 23) using features derived from the object boundaries computed above: area, compactness and minimum curvature. The Fisher classifier is trained on a large number of example slides provided by a histopathologist where accurate ground truth (epithelial cell nuclei or otherwise) is also available. The Fisher classifier value is given by:

$$F = a_1 A + a_2 Cp + a_3 C_{min} + a_4$$

where A is the area, Cp is the compactness, $C_{min}$ is the minimum curvature, and the coefficients $a_i$ have been derived from the training stage as [0.0003316, 0.0501399, −41.1688001, 0.8913501].

Instead of setting a threshold on the output from the Fisher classifier (a hard decision boundary) to classify each object as an epithelial cell nucleus or otherwise, a fuzzy classifier is used instead. The threshold is replaced by a function h(F) that returns a real number between 0 and 1 that represents the confidence (probability) that the object is of class A (epithelial cell nuclei); the confidence of class B (other objects) is 1-h(F). This algorithm is applicable to any classifier that initially computes a real number F and then applies a threshold T to indicate to which class the object belongs, not just the Fisher classifier.

The algorithm requires training data to calibrate the function h; this training data comprises a set of classifier values $F_k$ and a set of class confidences $c_k$, where $c_k=1$ indicates complete confidence that the object class is A and $c_k=0$ indicates complete confidence that the object class is B. In this instance, the confidences $c_k$ have been derived by inspection from a large set of candidate objects in the sample data. Using this algorithm, it is possible to train an uncertain classifier with only binary values of $c_k$ (0 or 1); binary inputs do not necessarily result in binary values of h.

The algorithm calibrates h by searching for the closest fit of h($F_k$) to the values $c_k$, that is by minimising the following classification error:

$$E = \sum_k (h(F_k) - c_k)^2$$

where the functions h are constrained to be monotonic increasing, that is for all real values x, y.

$$x > y \Rightarrow h(x) \geq h(y)$$

The restriction to monotonic functions h reflects the requirement that large values of the raw classifier F should imply greater confidence that the class is A.

In practice the computational load of searching over the entire set of monotonic functions could be very great, especially if the number of training data is large. The particular algorithm used, therefore, reduces the computational overhead by considering only monotonic step functions, which are constant except at a finite number of discontinuities between each step. Such functions are represented as follows:

$$h(F) = \sum_k a_k h_k(F)$$

where $a_k$ are non-negative constants and $h_k$ are each single steps of the form:

$$h_k(F) = \begin{cases} 0 & F < F_k \\ 1 & F \geq F_k \end{cases}$$

where $F_k$ are the prescribed discontinuities of h. The search for the optimum h is achieved by searching over the set of non-negative numbers $a_k$, which can be achieved by various off-the-shelf optimisation algorithms, in particular Sequential Quadratic Programming, which is implemented in MATLAB® as part of the function quadprog.

The specification of the discontinuities $F_k$ affects the accuracy of the approximation of the true optimum h by the optimum step function above. It is beneficial to place $F_k$ with high density where h is expected to vary the most, although the exact placement of $F_k$ is not important. In this implementation $F_k$ are chosen such that the number of training values F is equally distributed between adjacent discontinuities, that is the numbers of F between adjacent pairs of $F_k$ are equal as possible.

26 Calculation of Cancer Metric

The measure chosen for grading nuclear pleomorphism is one which measures the variability in size of identified epithelial cell nuclei alone. Although in theory the degree of pleomorphism depends on variability in shape as well as size, the analysis method has been found to be effective using size alone.

The area of each remaining object as calculated in stage 24 is taken, then a weighted standard deviation of these areas is found, where the weighting is proportional to the likelihood that the respective object represents an epithelial cell nucleus. The weighted standard deviation is defined as:

$$wstd = \sqrt{\frac{\sum_i p_i \cdot (A_i - \mu_A)^2}{\sum_i p_i}}$$

where $A_i$ is the area of object i, $\mu_A$ is the mean of all the areas A, and $p_i$ is the probability that it is an epithelial cell nucleus (as calculated in stage 25 above).

A lookup table is then used to convert the weighted standard deviation of areas (measured in pixels) to a points score. Values selected experimentally for this lookup table are:

| Standard deviation of area (pixels) | Points score |
| --- | --- |
| <250 | 1 |
| >=250 and <400 | 2 |
| >=400 | 3 | where a points score of 1 indicates the least serious cancer grade and a points score of 3 the most serious.

The whole process of stages 21 to 26 is performed separately for each of the two tiles selected for analysis and the higher of the two scores (if different) is taken as the result for input to the report generator 3.

Overview of Second Preferred Pleomorphism Detection and Grading

Figure 3:
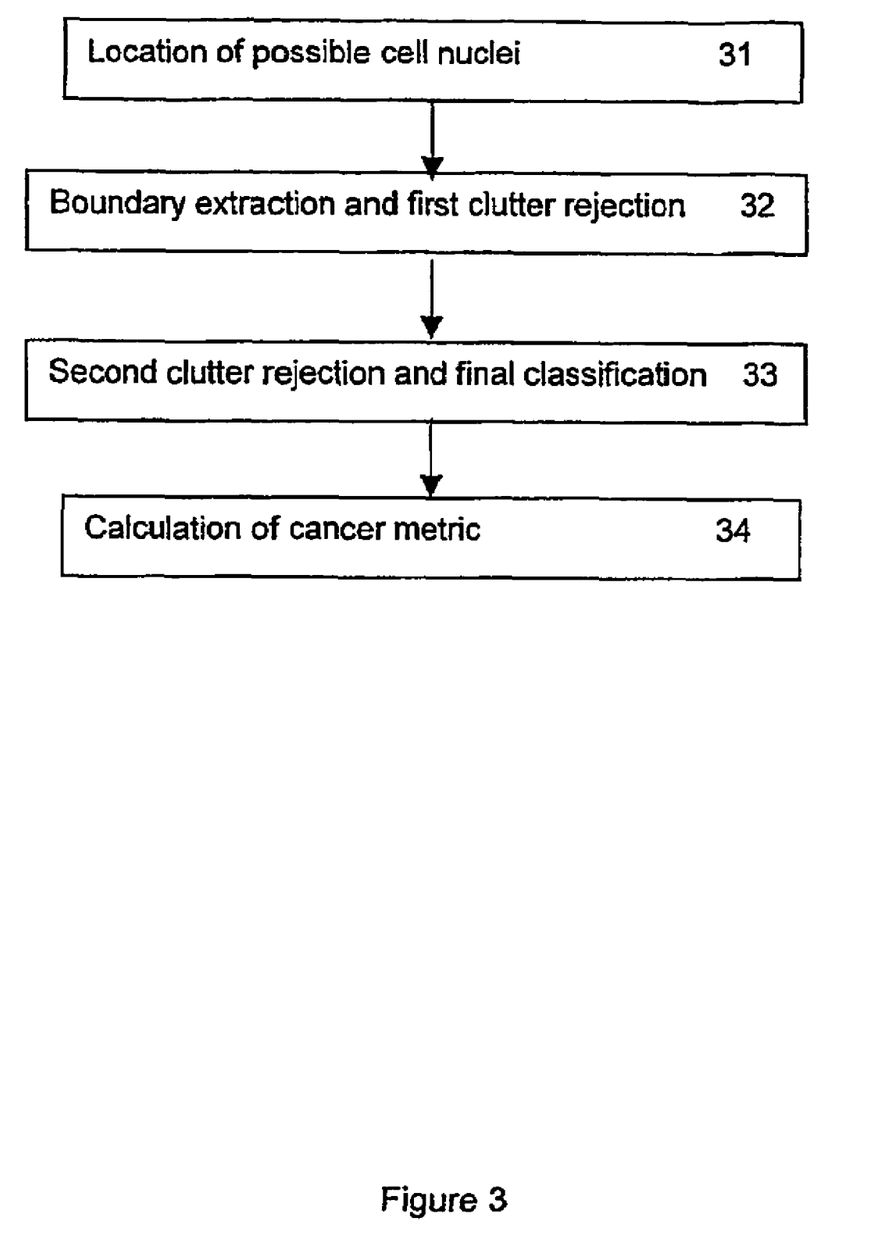
FIG. 3 is a more detailed block diagram of the main stages in a second preferred embodiment of the pleomorphism detection and grading block of FIG. 1.

FIG. 3 shows in more detail the processing stages comprised in the block 2 of FIG. 1 in a second preferred embodiment. As in the case of the embodiment of FIG. 2, the FIG. 3 process is carried out for both of two digitised images (tiles) acquired as previously described, and will be described for one such image. As before, the aim of the process is to identify the nuclei of as many epithelial cells as possible (whether cancerous or not), measure their characteristics, and hence assess their variability to quantify nuclear pleomorphism. The major difference to the first embodiment lies in the method for extracting the boundaries of objects in the image which potentially represent epithelial cell nuclei. It is computationally less intensive than the first embodiment and hence capable of analysing the same image data to assess nuclear pleomorphism in a substantially shorter period.

The second embodiment involves the deformation of a closed loop within each selected object, starting with a small circle in its interior and moving outwards towards the boundary.

The deformation at each point of the curve is in the normal direction, and the amount of deformation is governed by the image gradient; smaller displacements occur when the image is darker on the inside, so the deformation is retarded near the object's boundary. The deformation is normalised to be always positive (outward). Deformation stops when an area threshold is exceeded, where the latter comfortably exceeds the area of the largest epithelial cell nuclei.

The interiors of many epithelial cell nuclei are grainy, with many lighter regions which might be mistaken locally for a nuclear boundary, so the deformation algorithm has been adapted in two ways to move over these regions. First, the deformation distance is smoothed, so small lighter regions do not retard progress too much. Second, deformation is increased when the curve is concave, preventing permanent concavities which would otherwise occur near lighter internal regions.

The curve with the best overall fit to the boundary is then selected, based on the proportion of the curve for which the exterior is brighter than the interior. This curve is then refined by finding a local maximum in edge gradient followed by deformation to a local maximum of image grey-level.

The above deformation will fit curves to clutter as well as to genuine nuclei, so two metrics are computed to help reject clutter. The first metric, normal gradient consistency, is the same as used to select the curve closest to the boundary. The second metric quantifies how closely the curve is aligned to contours in image grey-level.

The broad structure of the algorithm is in four stages as shown in FIG. 3:

(31) Image filtering to identify locations of possible cell nuclei.

(32) Boundary extraction using wave propagation and initial clutter rejection based on boundary characteristics.

(33) Second clutter rejection and final classification based on size, shape and intensity measurements to give a likelihood that each detected object is an epithelial cell nucleus.

(34) Calculation of cancer metric, quantifying the variation in nuclear size.

Further details of these processing stages are described in the following sections.

31 Location of Possible Cell Nuclei

The boundary extraction algorithm to be more particularly described below requires an initial circle for each object; the centres of these circles are generated from local extrema of large-scale radially-symmetric filters.

The general principle is; given that the approximate size of the cell nuclei of interest is known, to apply a radially-symmetric filter whose output is large in magnitude when there is a region of local brightness or darkness whose shape and size approximately matches that of the filter. Cell nuclei do not necessarily appear in the image as connected groups of dark pixels, but as a region containing a sufficient number of dark pixels. This method is able to encompass slides containing both solid and hollow nuclei, since in the latter a region surrounding a hollow nucleus will contain at least all the dark pixels in the nuclear boundary.

The method will now be described in terms of a specific implementation, namely a multi-scale smoothing filter. The process will be described for filtering the image using a particular size of filter, where these are defined at successive octave (powers of 2) scale sizes. The recursive construction process for the multi-scale filter involves the 3×3 smoothing filter(s) as defined below.

$$s = \frac{1}{16}\begin{pmatrix} 1 & 2 & 1 \\ 2 & 4 & 2 \\ 1 & 2 & 1 \end{pmatrix}$$

This filter forms a basis for filtering over a set of octave scale sizes, according to the following process:

To enhance blob-shaped objects at octave scale 2 (pixel size 3), the image is correlated with the 3×3 smoothing filter as follows:

$$F_1(m, n) = \sum_{i=-1}^{1} \sum_{j=-1}^{1} I(m+i, n+j) * s(i+2, j+2)$$

where I is the original image, and the range of the indices m and n is set such that the indices in the summation above are always within the original image dimensions (so m and n start at 2). Values of the filtered image at locations outside these ranges are set to zero.

To enhance radially-symmetric objects at the next resolution (octave scale 3, pixel size 5), the 3×3 smoothing filter(s) is expanded by a factor of two, by padding it with zeros, to form a 5×5 filter [1 0 2 0 1; 0 0 0 0 0; 2 0 4 0 2; 0 0 0 0 0; 1 0 2 0 1]. This is then correlated with the filtered image at the previous scale ($F_1$) to form a new filtered image ($F_2$), but for computational efficiency, only the non-zero filter coefficients are used, thus:

$$F_2(m, n) = \sum_{i=-1}^{1} \sum_{j=-1}^{1} F_1(m+2i, n+2j) * s(i+2, j+2)$$

where the range of the indices m and n is set such that the indices in the summation above are always within the original image dimensions (so m and n start at 4). Values of the filtered image at locations outside these ranges are set to zero.

To enhance blob-shaped objects at a resolution two octaves above the original (scale 4, pixel size 9), the smoothing filter is expanded by another factor of 2 in the same manner as above, then correlated with the previously filtered image ($F_2$) above to give a lower-resolution smoothed image ($F_3$) thus:

$$F_3(m, n) = \sum_{i=-1}^{1} \sum_{j=-1}^{1} F_2(m+4i, n+4j) * s(i+2, j+2)$$

This process is repeated to obtain results at successive octave scales, namely expanding the smoothing filter each time.

The above process may be used to produce a "blob-filtered" image at any of the required octave scales. Objects comprising clusters of light or dark pixels will have the greatest values of the magnitude of the filter output and the locally strongest filter output will occur at the centre of the respective such object. Individual objects can therefore be identified by finding local maxima (for objects with positive intensity) or minima (for objects with negative intensity) of the filter output, where each object is assigned a position and intensity, the latter being the value of the filter output at the local extremum.

In this application, objects which may represent epithelial cell nuclei are dark relative to the background in the original image, but the original image pixel values are always positive, so the original image is "reversed in sign" prior to the above filtering, by subtracting each pixel value from 255, so that objects which originally appeared dark now appear bright, and have positive pixel values. Objects of interest are now identified by finding local maxima of the filter output at two chosen scales, in this instance octave scales 5 and 6. In less severe cancers the epithelial cell nuclei are smaller, so tend to get picked up at scale 5, while in more severe cancers the nuclei may be larger, and hence are detected at scale 6. Also, scale 6 alone is not very effective where the nuclei are closely packed; scale 5 is better at picking them out in such circumstances. The aim is to ensure that the nuclei of as many epithelial cells as possible (not just the cancerous ones) are identified to measure the overall variability in nuclear size for pleomorphism.

For computational efficiency, the spatial resolution of the image is reduced prior to filtering, using the following thinning method. Each reduction in resolution by a factor of two (a "thin") is achieved by firstly correlating the image with the 3×3 smoothing filter(s), then sub-sampling by a factor of two. The formula for a single thin is:

$$T(m, n) = \sum_{i=-1}^{1} \sum_{j=-1}^{1} I(2m + i, 2n + j) * s(i + 2, j + 2)$$

where I is the original image, T is the thinned image, and the indices m and n range from 1 to the dimensions of the thinned image. Each dimension of the thinned image is given by subtracting 1 or 2 from the corresponding dimension of the original image, depending on whether this is odd or even respectively, then dividing by 2.

In this instance, the image is reduced in resolution by a factor of 4, by applying the above process twice, firstly on the original image, and then again on the resulting thinned image, to produce a new image whose linear dimensions are a quarter of the size of the original (area is 1/16). For example, an original image of a tile of size 1476×1160 pixels would become 368×289 pixels. Objects are now extracted as described above from the reduced-resolution image at octave scales 3 and 4, this being equivalent to extracting objects at scales 5 and 6 from the original image, but being more computationally efficient.

This process identifies all objects which form dark clusters of the requisite size, which may include not only epithelial cell nuclei but also background clutter, such as lymphocytes or connective tissue. Since it is known that the faintest objects (the least dark ones in the original image) are unlikely to be epithelial cell nuclei, only those objects whose filter output values are amongst the strongest 75% are selected for further analysis.

32 Boundary Extraction Using Wave Propagation, and First Clutter Rejection

The next processing stage 32 is performed for each object of interest selected from stage 31 and uses the data in the full-sized original image (red component). It involves the evolution of a closed loop that starts inside the object, and converges to the object's boundary, or a smooth approximation thereof. The method is similar to the method of 'balloons' (also known as snakes or active contours) as described for example in "Finite-Element Methods for Active Contour Models and Balloons for 2-D and 3-D images", Cohen, L. D. and Cohen, I., PAMI, Vol 15, No 11, pp 1131-1147, November 1993, where a cost function based on image grey-level or gradient is minimised. An outline of the method for an individual object is as follows:

1. Start with a circle inside the object. This is centred on the respective position identified from the filter output in stage 31 and in the preferred embodiment has a radius of 10 pixels for an object detected at scale 5 and a radius of 20 pixels for an object detected at scale 6.
2. Deform the closed curve repeatedly by repositioning its coordinates along the normal direction at each of a plurality of equi-spaced points around the curve. The amount of deformation at each point is governed by the gradient of image grey-level in the normal direction; larger positive gradients (darker on the inside and brighter on the outside) result in smaller displacements, and vice versa. This causes the curve to move faster over relatively even parts of the object's interior, but to slow down near its boundary. In the preferred embodiment 32 points around the curve are used for deformation, equi-spaced in terms of arc length on each occasion.
3. Record the coordinates of the curve after each deformation step and measure its area (using Green's Theorem as referred to in stage 24 of the first preferred detection and grading process).
4. Stop the deformation when the area inside the curve exceeds a threshold chosen to comfortably exceed the area of the largest typical healthy or cancerous epithelial cell nucleus.
5. Choose the curve which has the greatest consistency of positive image gradient in the outward normal direction, i.e. as much of the curve as possible is darker on the inside than the outside, and reject clutter on the basis of selected edge metrics.
6. Refine the curve chosen in Step 5 (if not rejected as clutter) by finding for each point a local maximum of edge gradient and then deforming to a local maximum of image grey-level.

The following sub-sections describe these stages in more detail, and summarise results.

Curve Deformation

The deformation in Step 2 above is designed to converge to object edges with the following properties:

The edge is fairly smooth in shape and mostly convex;
The edge is fairly sharp, that is the grey-level gradient is quite high normal to the edge. However, there may be high-frequency variations in grey-level in the interior of the object (graininess) which cause the edge gradient to vary greatly over short distances.

Graininess of an object's interior and the presence of nearby or overlapping objects makes its boundary difficult to detect, so it is important that the deformation algorithm takes advantage of the above properties of smoothness, convexity and sharpness. This is achieved by:

Only deforming outwards;
Smoothing the deformation distance normal to the curve as a function of arc length tangential to the curve.
Penalising concavity (negative curvature) by increasing the deformation distance on the concave parts of the curve to make the curve bulge outwards.

The calculation of the deformation distance at each of the selected points around the curve therefore has the following steps:

2.1 Calculate the grey-level gradient at each point normal to the curve. This is done by finding the image grey-level at each point on the curve, and at corresponding points a prescribed distance along the outward normal (typically 3 pixels), and taking the difference.

2.2 Normalise the above gradients to lie between 0 and 1 as follows: subtract each gradient from the maximum of those gradients and divide by the range in gradient.

2.3 At points where the curvature is negative (centre of curvature outside the curve) add to the respective figure derived in Step 2.2 the absolute value of curvature at the respective point multiplied by the arc length of the curve between that point and the next and divided by $2\pi$.

2.4 Apply a low-pass (smoothing) filter to the curve as if deformed by the distances calculated above. Because the curve is a closed loop, the displacement function is cyclic, so an effective way of doing this is to calculate the Fourier Transform, set the higher-frequency terms to zero, and then compute the inverse Fourier Transform.

2.5 Finally, normalise the set of deformation distances corresponding to a curve as smoothed in Step 2.4 as follows: subtract the minimum of those distances from each distance, divide by the range in those distances and multiply by a prescribed number, typically 3. The result is a figure for each point lying between 0 and a prescribed maximum (in this case 3) which defines the distance, in units of pixel dimensions, by which the curve is to be deformed at the respective point.

Boundary Refinement

The above deformation will not fit the boundary of a respective object exactly because of the smoothness and convexity constraints, and also because the curve will not reach all parts of the boundary simultaneously. Further deformations are therefore undertaken to refine the boundary.

The exact location of the boundary is somewhat subjective, especially if the edge is blurred. There is a compromise between finding the greatest gradient where the edge is strongest and the maximal extent of the object. The boundary refinement in Step 6 above therefore has the following steps:

6.1 At each point around the curve, find the image grey-level at selected points along the normal vector, in the preferred embodiment points are chosen at integer distances between −5 and +5 pixels, where negative distances denote the inward-pointing normal.

6.2 Find the point along each normal where the normal gradient is maximal.

6.3 Find the position of the first local maximum in grey-level along each normal which is further out than the respective point in Step 6.2, and deform to that position. If there is none (grey-level is monotonic), find the position of the first grey-level outwardly from the point in Step 6.2 along the respective normal that is at least 90% of the grey level at the +5 pixel point referred to in Step 6.1, and deform to that position.

6.4 Apply a low-pass filter similar to Step 2.4 of the original curve deformation, but this time with less smoothing.

6.5 Repeat Steps 6.1-6.4 once, to allow total refinement displacements of up to 10 pixels.

Edge Metrics

Measures of edge consistency along the curve are required both to choose the best curve (the one closest to the object's boundary) in Step 5 above and to reject cases where a boundary has not been found or fitted too poorly to be of use in further analysis, e.g. the measurement of area.

Two edge metrics are computed:

Normal gradient consistency: a measure of the proportion of the edge which is positive (darker on the inside). A high value indicates a good fit.

Gradient direction alignment: a measure of the average angle between the curve normal and the grey-level gradient vector. This metric is low if the curve is close to a grey-level contour, and a low value indicates a good fit.

The first metric is the mean normal gradient (that is to say the mean of the grey-level gradients in the outward normal direction at each of the selected points around the curve) divided by the mean absolute normal gradient (that is to say the mean of the grey-level gradients in the outward normal direction at each of the selected points around the curve with the sign of any negative gradients changed to positive), and thus is bounded between −1 and +1, and is +1 only if there are no points at which the object is brighter on the inside. This metric is used both to select the best curve during the initial deformation stage and to reject clutter. That is to say, in Step 5 above this metric is calculated for each of the curves recorded in Step 3. The curve for which this metric is found to have the highest value is selected and the second metric below is then calculated for it. If there are more than one such curve with this value then the innermost one is selected. If all such curves have a value for the first metric below a specified threshold, however, the object in question is rejected as clutter and not processed further. In the preferred embodiment this threshold is set at the maximum possible value, namely +1, but a lower threshold might be appropriate in other embodiments.

The second metric is used as an additional criterion for boundary selection, and is useful for rejecting curves which surround objects representing several nuclei. This metric is the mean value of the absolute values of the sine of the angle between the curve normal and the gradient vector (direction of greatest change in grey-level) at each of the selected points around the curve. This metric is thus bounded between 0 and 1 and is 0 only if the curve is coincident with a grey-level contour. It is calculated for the single curve selected for the respective object (if any) after calculation of the first metric above. In the preferred embodiment those objects having the curves with the highest 50% of values of this metric in a given tile are then rejected as clutter and not processed further.

Example Results

Figure 4:
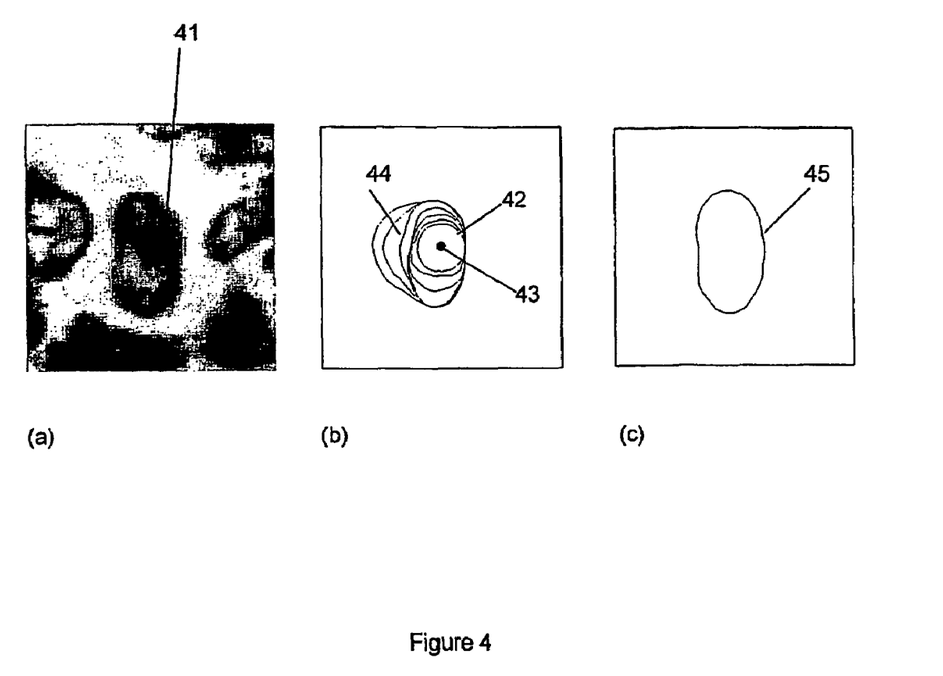
FIG. 4 is a visualisation of the boundary extraction process performed in a stage of FIG. 3.

FIG. 4 is a visualisation of the boundary extraction process performed in stage 32 for a typical object. FIG. 4(a) is a reproduction of a small region taken from an actual image which includes an object 41 representing an epithelial cell nucleus. FIG. 4(b) depicts successive stages in the wave propagation as described in Steps 1 to 4 above for this object, starting from an inner circle 42 centred on the position 43 identified for the object in stage 31 and evolving outwards in successively deformed curves. Curve 44 is the one chosen in Step 5 above and FIG. 4(c) depicts the boundary 45 as finally derived after refinement of this curve in Step 6 above. FIGS. 4(b) and 4(c) have been generated from data in the image reproduced in FIG. 4(a) using an actual implementation of the algorithm described herein and FIG. 4(c) shows how well the boundary 45 thus derived matches the actual boundary of the object 41 in FIG. 4(a).

33 Second Clutter Rejection and Final Classification

This stage aims to remove curves corresponding to objects in the image which are unlikely to be epithelial cell nuclei. This uses a fuzzy Fisher classifier as described for stage 25 in the first preferred pleomorphism detection and grading process (to which reference is directed), but uses a slightly different set of features measured from each curve finally derived in stage 32, namely area, compactness, and maximum and minimum grey level within the curve.

The Fisher classifier value is given by:

$$F = a_1 A + a_2 Cp + a_3 G_{max} + a_4 G_{min} + a_5$$

where A is the area, Cp is the compactness, $G_{max}$ is the maximum grey level of the original image pixels located within the curve and $G_{min}$ is the minimum grey level. The coefficients $a_i$ which have been derived from training are [0.0077, −0.8946, −0.1372, 0.1415, 14.6004].

34 Calculation of Cancer Metric

The measure chosen for grading nuclear pleomorphism is one which measures the variability in size alone, as described for stage 26 in the first preferred detection and grading process (to which reference is directed), in which a weighted standard deviation of object areas is computed, where the weighting is proportional to the likelihood that the respective object represents an epithelial cell nucleus.

A lookup table is then used to convert the weighted standard deviation of areas (measured in pixels) to a points score. The area limits are different to those for the previous algorithm, because the different method of calculating the nuclear boundary means that areas are generally higher than in the first embodiment Values selected experimentally for this lookup table are:

| Standard deviation of area (pixels) | Points score |
| --- | --- |
| <400 | 1 |
| >=400 and <900 | 2 |
| >=900 | 3 |

It will be appreciated that the coding of computer programs to implement all of the processing stages described above for the preferred embodiments of the invention can be achieved by a skilled programmer in accordance with conventional techniques. Such programs and code will therefore not be described further.

The invention claimed is:

1. A method for the automated analysis of a digital image having an array of pixels including using a computer or processor to perform the successive steps comprising:
   (a) identifying locations of objects within the image which have specified intensity and size characteristics;
   (b) deriving respective boundaries for respective such objects;
   (c) assessing the significance of objects based on statistics concerning at least the shapes of their respective derived boundaries; and
   (d) calculating a measure of the variability among a group of such objects within the image of at least the areas enclosed by their respective derived boundaries subject to the results of said assessment of significance;
   wherein step (c) comprises assigning probabilities that respective objects are members of a specified class based on specified said statistics and said measure in step (d) is the standard deviation of the areas enclosed by said derived boundaries weighted in accordance with the respective probabilities.

2. A method according to claim 1 wherein step (a) comprises the application of a radially-symmetric difference filter with zero mean.

3. A method according to claim 2 wherein the image is filtered at a plurality of resolutions of increasing scale.

4. A method according to claim 2 wherein said locations are identified in accordance with the locations of respective extrema in the output of said radially-symmetric difference filter.

5. A method according to claim 1 wherein step (b) comprises:
   defining regions of specified extent within the image which contain respective said objects; and
   deriving from the data within respective said regions a respective closed contour (if any) consisting of points of the same specified intensity.

6. A method according to claim 5 further comprising determining whether respective said contours meet specified location and/or intensity orientation criteria and rejecting from further processing any such contours which do not.

7. A method according to claim 5 further comprising tracking respective said contours and measuring a curvature thereof.

8. A method according to claim 7 wherein said tracking and measuring of the curvature is performed by use of a Probability Density Association Filter.

9. A method for the automated analysis of a digital image having an array of pixels including using a computer or processor to perform the successive steps comprising:
   (a) identifying locations of objects within the image which have specified intensity and size characteristics;
   (b) deriving respective boundaries for respective such objects;
   (c) assessing the significance of objects based on statistics concerning at least the shapes of their respective derived boundaries; and
   (d) calculating a measure of the variability among a group of such objects within the image of at least the areas enclosed by their respective derived boundaries subject to the results of said assessment of significance;
   wherein step (b) comprises:
   defining regions of specified extent within the image which contain respective said objects: and
   deriving from the data within respective said regions a respective closed contour (if any) consisting of points of the same specified intensity
   and wherein step (a) comprises the application of a radially-symmetric difference filter with zero mean and, for respective said regions, the respective said contour is derived from the output of said radially-symmetric difference filter with zero mean for the respective region.

10. A computer readable medium having program code recorded thereon for executing the method according to claim 9.

11. A method according to claim 1 wherein step (c) comprises rejecting objects if the enclosed area of their respective derived boundaries is less than a specified value or if the minimum curvature of their respective derived boundaries is less than a specified value.

12. A method according to claim 1 wherein said assignment of probabilities is performed by use of a Fisher classifier.

13. A method according to claim 1 wherein the image is of a histological or cytology specimen.

14. A computer readable medium having program code recorded thereon for executing the method according to claim 1.

15. A method for the automated analysis of a digital image having an array of pixels including using a computer or processor to perform the successive steps comprising:
   (a) identifying locations of objects within the image which have specified intensity and size characteristics;

(b) deriving respective boundaries for respective such objects;
(c) assessing the significance of objects based on statistics concerning at least the shapes of their respective derived boundaries; and
(d) calculating a measure of the variability among a group of such objects within the image of at least the areas enclosed by their respective derived boundaries subject to the results of said assessment of significance;
and further comprising, following step (a):
defining masks of specified extent within the image around the identified said locations;
calculating for respective said masks at least one intensity threshold from the pixels within the respective mask; and
thresholding the pixels within respective masks using the respective threshold(s) calculated therefor;
whereby to derive a set of binary images corresponding to said masks and containing a set of regions representing connected pixels of a specified class of intensity in relation to the applied thresholding.

16. A method according to claim 15 wherein two said thresholds are calculated for respective masks and hysteresis thresholding is applied to the pixels within respective masks using the two respective thresholds.

17. A method according to claim 15 further comprising:
calculating from data in regions of the original image corresponding to respective said binary image regions statistics concerning their size, shape and/or intensities therein; and
accepting or rejecting for further analysis objects corresponding to such regions on the basis of such statistics.

18. A method according to claim 17 comprising the step of calculating statistics from data in regions of the original image corresponding to respective said binary image regions wherein said statistics comprise: the area of the respective region; the thickness of the respective region (as hereinbefore defined); the maximum intensity of the pixels within the respective region; and the minimum intensity of the pixels within the respective region.

19. A method according to claim 17 wherein said accepting or rejecting of objects for further analysis is performed by use of a Fisher classifier.

20. A computer readable medium having program code recorded thereon for executing the method according to claim 15.

21. A method for the automated analysis of a digital image having an array of pixels including using a computer or processor to perform the successive steps comprising:
(a) identifying locations of objects within the image which have specified intensity and size characteristics;
(b) deriving respective boundaries for respective such objects;
(c) assessing the significance of objects based on statistics concerning at least the shapes of their respective derived boundaries; and
(d) calculating a measure of the variability among a group of such objects within the image of at least the areas enclosed by their respective derived boundaries subject to the results of said assessment of significance;
wherein step (b) comprises, for respective objects:
establishing a closed curve of specified form around the respective location;
deforming the curve outwardly in accordance with intensity characteristics of the image in the direction normal to the curve at a plurality of points around the curve;
repeating the aforesaid deformation until the area enclosed by the curve exceeds a specified threshold; and
selecting, from the resultant set of deformed curves, one which best meets specified characteristics of intensity gradient across the curve.

22. A method according to claim 21 wherein it is arranged that the distance by which the curve is deformed at any said point is related to the intensity gradient in the outward normal direction at that point such that the larger the gradient the smaller the deformation.

23. A method according to claim 21 wherein it is arranged that the distance by which the curve is deformed at any said point is increased if the curve is of negative curvature at that point.

24. A method according to claim 21 wherein the method for calculating the distance by which the curve is to be deformed at each such point at each such deformation includes calculating the respective intensity gradient in the outward normal direction at each such point and normalising the same.

25. A method according to claim 24 wherein said normalising comprises subtracting the respective gradient from the maximum of such gradients and dividing the result by the range in such gradients.

26. A method according to claim 24 wherein such calculating further comprises, if the curve is of negative curvature at the respective point, adding to the respective normalised gradient the absolute value of such curvature multiplied by the arc length of the curve between that point and the next point and divided by $2\pi$.

27. A method according to claim 26 wherein such calculating further comprises applying a smoothing filter to the results of such adding and normalizing the results of such smoothing by subtracting the minimum of such smoothed distances from each such smoothed distance, dividing the result by the range in such smoothed distances and multiplying by a prescribed number.

28. A method according to claim 21 which comprises calculating, for respective members of said set of deformed curves, a metric comprising the respective mean normal intensity gradient divided by the respective mean absolute normal intensity gradient.

29. A method according to claim 28 wherein said selecting comprises selecting a deformed curve from said set which has the highest value of said metric.

30. A method according to claim 28 wherein if none of said set of deformed curves has a value of said metric reaching a specified threshold then the respective object is rejected.

31. A method according to claim 21 which comprises calculating, for the deformed curve selected from said set, the mean value of the absolute values of the sine of the angle between the curve normal and the intensity gradient vector at a plurality of points around the curve, and rejecting the respective object if such mean value is above a specified threshold.

32. A method according claim 21 wherein step (b) comprises, for respective objects, further deforming the curve selected from the respective said set of deformed curves in accordance with intensity characteristics of the image in the direction normal to the curve at a plurality of points around the curve.

33. A method according to claim 32 wherein said further deformation comprises, at each such point, finding a position within a specified distance along the normal inward and outward of the curve where the intensity gradient is maximal.

34. A method according to claim 32 wherein said further deformation further comprises at each such point, deforming the curve to the position of the first maximum in intensity in the normal direction outwardly of said position of maximal intensity gradient within a specified distance, or if there is no such maximum, deforming the curve to the nearest position in the normal direction outwardly of said position of maximal intensity gradient within a specified distance where the intensity is within a specified proportion of the intensity at said distance.

35. A computer readable medium having program code recorded thereon for executing the method according to claim 21.

36. A method for the automated analysis of a digital image having an array of pixels including using a computer or processor to perform the successive steps comprising:
   (a) identifying locations of objects within the image which have specified intensity and size characteristics;
   (b) deriving respective boundaries for respective such objects;
   (c) assessing the significance of objects based on statistics concerning at least the shapes of their respective derived boundaries; and
   (d) calculating a measure of the variability among a group of such objects within the image of at least the areas enclosed by their respective derived boundaries subject to the results of said assessment of significance;
   wherein step (c) comprises assigning probabilities that respective objects are members of a specified class based on statistics comprising: the area enclosed by the derived boundary; the perimeter of the derived boundary squared divided by the area enclosed by the derived boundary; and the minimum curvature of the derived boundary.

37. A computer readable medium having program code recorded thereon for executing the method according to claim 36.

38. A method for the automated analysis of a digital image having an array of pixels including using a computer or processor to perform the successive steps comprising:
   (a) identifying locations of objects within the image which have specified intensity and size characteristics;
   (b) deriving respective boundaries for respective such objects;
   (c) assessing the significance of objects based on statistics concerning at least the shapes of their respective derived boundaries; and
   (d) calculating a measure of the variability among a group of such objects within the image of at least the areas enclosed by their respective derived boundaries subject to the results of said assessment of significance;
   wherein step (c) comprises assigning probabilities that respective objects are members of a specified class based on statistics comprising: the area enclosed by the derived boundary; the perimeter of the derived boundary squared divided by the area enclosed by the derived boundary; the maximum intensity of the original image pixels within the derived boundary; and the minimum intensity of the original image pixels within the derived boundary.

39. A computer readable medium having program code recorded thereon for executing the method according to claim 38.

40. A method for the automated analysis of a digital image having an array of pixels including using a computer or processor to perform the successive steps comprising:
   (a) identifying locations of objects within the image which have specified intensity and size characteristics;
   (b) deriving respective boundaries for respective such objects;
   (c) assessing the significance of objects based on statistics concerning at least the shapes of their respective derived boundaries; and
   (d) calculating a measure of the variability among a group of such objects within the image of at least the areas enclosed by their respective derived boundaries subject to the results of said assessment of significance;
   wherein step (c) comprises assigning probabilities that respective objects are members of a specified class based on specified said statistics, the image is of a section of breast tissue and said specified class is identified as the class of epithelial cell nuclei.

41. A computer readable medium having program code recorded thereon for executing the method according to claim 40.

* * * * *